United States Patent [19]

Wada et al.

[11] Patent Number: 4,529,991

[45] Date of Patent: Jul. 16, 1985

[54] METHOD FOR COPYING OPTICAL INFORMATION

[75] Inventors: Minoru Wada; Yonosuke Takahashi; Eiichi Hasegawa, all of Saitama, Japan

[73] Assignee: Fuji Photo Film Co., Ltd., Saitama, Japan

[21] Appl. No.: 380,318

[22] Filed: May 20, 1982

[30] Foreign Application Priority Data

May 20, 1981 [JP] Japan ................................. 56-74817
May 20, 1981 [JP] Japan ................................. 56-47818

[51] Int. Cl.³ ........................................... G01D 15/34
[52] U.S. Cl. ................................................. 346/76 L
[58] Field of Search ................... 346/1.1, 135.1, 76 L, 346/137; 358/297; 428/156, 913; 430/945; 355/78, 81

[56] References Cited

U.S. PATENT DOCUMENTS

| | | | |
|---|---|---|---|
| 3,588,439 | 6/1971 | Heller et al. | 346/76 L X |
| 3,610,724 | 10/1971 | Frizzell | 355/81 X |
| 3,911,444 | 10/1975 | Lou et al. | 346/76 L X |
| 3,990,084 | 11/1976 | Hamisch et al. | 430/945 X |
| 4,000,492 | 12/1976 | Willens | 346/76 L X |
| 4,334,233 | 6/1982 | Murakami | 346/135.1 |

FOREIGN PATENT DOCUMENTS 2074332  10/1981  United Kingdom ............ 346/135.1

*Primary Examiner*—Donald A. Griffin
*Attorney, Agent, or Firm*—Sughrue, Mion, Zinn, Macpeak, and Seas

[57] ABSTRACT

Methods for copying optical information are disclosed. The methods comprise the steps of disposing a master mask with a tracking signal or other information recorded therein over an optical memory material comprised of heat mode recording material which can be thermally altered in order to deform or remove the material upon the application of an energy beam, permitting recording on the altered recording material and irradiating the master disk with flash light for a period of 1 microsecond or less, or in the alternative, scanning with a laser beam focused to a spot having a diameter of at least 10 $\mu$m on the master mask with the exposure time at each area of the optical memory material being preferably 1 microsecond or less.

13 Claims, No Drawings

4,529,991

METHOD FOR COPYING OPTICAL INFORMATION

FIELD OF THE INVENTION

The present invention relates to a method for copying optical information in which tracking signals or information is recorded by thermally deforming heat mode material by the application of flash light or laser beam. More particularly, it is concerned with a thermal recording method whereby the recording of address signals or tracking signals, or information copying can be conducted in a short period of time with high resolving power.

BACKGROUND OF THE INVENTION

A recording method has heretofore been known, in which an optical disc comprising a plastic disc with a thermally deformable metal (e.g., tellurium and bismuth) coating provided thereon is scanned with a laser beam modulated by a tracking signal or information to record the tracking signal or information in the metal coating as a bit line. Such a method is described in, for example, G. C. Kenny et al, *An Optical Disc Replaces 25 Mag Tapes*, IEEE Spectrum, pp. 33–38, February (1979) and R. A. Bartolini et al, *Optical Disk Systems Emerge*, IEEE Spectrum, pp. 20–28, August (1978).

In order to copy the information recorded in an optical disc, useful methods include those in which a stamper is produced from the original disc by a technique, such as nickel plating, the surface of a plastic substrate is subjected to thermal processing using the stamper to form a plastic mold, and a metal coating is applied on the surface of the plastic mold by a method such as vapor deposition. Methods of this type are disadvantageous in that prolonged working time is required and the procedure becomes complicated.

Recently, there has been proposed a copying method in which a master mask with information recorded therein, e.g., a micro film, is exposed to flash irradiation to copy the recorded information (see, for example, U.S. Pat. Nos. 4,000,334, 4,267,261 and 4,199,615). In any of the methods disclosed in the above references, however, flash irradiation of 10 microseconds to several hundred milliseconds is applied. This causes the diffusion of heat in the recording layer in the crosswise direction during the period of recording. This results in the ability to obtain only a low resolving power.

The object of the invention, therefore, is to provide a method free of the above described defects and which makes it possible to copy optical information in a very short period of time and at a high resolving power of 1 $\mu$m or less.

SUMMARY OF THE INVENTION

The invention is concerned with a method for copying optical information. This method comprises disposing a master mask with a tracking signal or information recorded therein over an optical memory material comprising a heat mode material which is thermally deformed or removed by application of an energy beam, permitting recording therein, and irradiating the master mask with flash light for a period of 1 microsecond or less. The irradiation step may be carried out by scanning with a laser beam focussed to a spot having a diameter of at least 10 $\mu$m on the master mask.

DETAILED DESCRIPTION OF THE INVENTION

Hereinafter the invention is explained in detail.

The optical memory material as used herein comprises a heat mode material comprising a support and a thermally deformable or removable recording layer on the support.

Supports which can be used include plastic films, e.g., polyethylene terephthalate, polymethyl methacrylate and polycarbonate, a glass plate, paper, and a metallic plate or foil. Of these materials, films of polyethylene terephthalate, polymethyl methacrylate, and copolymers thereof are particularly preferred in view of their light weight, toughness, dimensional stability, and transparency.

The recording layer as used herein is a layer of high optical density. The layer is preferably formed of a substance forming a thin layer and having high covering properties. Typical examples of such substances are metals. In order to increase recording sensitivity, it is particularly preferred for the recording layer to be in the structure of a mixed layer comprising metal and another substance capable of increasing recording sensitivity as described hereinafter, or a superposed- or multi-layer comprising a metal layer and the substance layer.

The irradiation may be carried out using an electric flash for 1 microsecond or less. The recording layer then undergoes thermal changes such as melting, evaporation and aggregation, contributing to changes in optical transmission or reflectance. Depending on the purpose, various substances and layer constructions can be employed for the recording layer.

Metals which can be used for the recording layer include Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se. These metals can be used singly or in combination with each other. It is particularly desirable for the metal as used herein to be of low toxity. It is also desirable for the metal to require only a small amount of energy for melting or evaporation, and for it to be able to easily form a film. Of the above described metals, Sn, Bi, and In are most preferred. These metals are provided on the support singly or in combination with other or as alloys, by various techniques such as vapor deposition, sputtering, ion plating, electroplating, and electroless plating, directly or through an undercoated layer to form a single layer or multi-layer. When high sensitivity is desired, the recording layer may be formed as a layer in which the metal is physically mixed with the substance as described hereinafter by a technique such as co-vapor deposition.

The thickness of the metal layer is sufficient to be capable of providing an optical density necessary as an image. For example, in order to obtain a transmission density of 2, the thickness is sufficient if it is from 300 to 1,500 Å. Of course, the thickness varies depending on the type of the metal used.

When high sensitivity is desired it is preferable if the recording layer is a laminated layer comprising the above described metal layer and a layer of a substance which is described hereinafter as a substance to increase recording sensitivity, or a mixed layer in which the above described metal and substance are mixed. These substances accelerate the thermal changes, e.g., melting, evaporation and aggregation, of the metal layer by preventing reflection.

Substances which can be used for the above purpose include oxides such as PbO, $WO_3$, $TiO_2$, SiO, $SiO_2$, $ZrO_2$, SnO, $SnO_2$, InO, $In_2O_3$, and $In_2O$; chalcogenide substances containing Ge, In, Sn, Cu, Ag, Fe, Bi, Zn, V, etc.; halides such as $PbX_2$, AgX, $SnX_2$, $SbX_5$ and $SbX_3$ (wherein X represents a halogen, e.g., fluorine, chlorine, bromine, and iodine); and As, Sb, P, Ge, Si, Te, etc. Of these substances, GeS, SnS, and $PbI_2$ are particularly preferred.

In order to increase the mechanical strength of the optical memory material of the invention, a protective layer composed mainly of an organic polymerous substance may be provided on the metal layer. However, when this is done it is necessary to choose the type of the organic polymerous substance and the film thickness so as not to prevent the thermal deformation of the metal layer due to the absorption of either flash light or absorption from a laser beam.

Organic polymerous substances which can be used for that purpose include natural substances, such as gelatin, gelatin derivatives, and cellulose derivatives; latex-like vehicle compounds; and synthetic polymers, such as polyurethane, polyvinylidene chloride, polyvinyl acetate, polyvinyl butyral, polycarbonate, polyamide, polyester, fluorocarbons, polyacrylonitriles and their copolymers.

In accordance with the method of the invention, the master mask with tracking signal or information recorded therein is disposed over the above described optical memory material so that they are adjacent to each other.

The master mask as used herein is produced as follows:

A metal (e.g., Cr, Al, and Ag) coating is provided on a thin glass plate or a transparent plastic substrate, e.g., acryl resin plate, by a technique such as vapor deposition, sputtering or ion plating. Thereafter, a light-sensitive resin layer is provided on the metal coating layer by a technique such as coating.

The light-sensitive resin layer is scanned with an electrically modulated high energy beam such as a laser beam. Thereafter, it is developed with a developer to remove the light-sensitive resin layer in the pattern corresponding to the laser irradiation, exposing the metal layer. The exposed metal layer pattern is removed by etching with a suitable etching liquid, and finally the remaining resin layer is removed. In this way, there can be obtained a master mask with a tracking signal or information recorded in the metal layer thereof.

In accordance with another method, a master mask can be produced by applying a laser beam directly on a metal layer as prepared by the above described method to melt and remove the metal layer in the pattern corresponding to the laser irradiation.

In these methods, since a beam which is focussed to a spot of diameter of several microns is used as the laser beam, the bit recorded is of nearly the same size.

When a chromium mask prepared by vapor-depositing chromium on a glass plate is used as a master mask, it can be used repeatedly, permitting the production of a number of copies from one master mask.

As described above, the master mask with information recorded therein is disposed over the above described optical memory material, and then, flash irradiation is applied to the master mask for an irradiation time of 1 microsecond or less using, e.g., an electric flash gun. When using this method the flash must melt or cause evaporation or aggregation of the heat mode material existing below the master mask over the entire area irradiated through the transparent pattern recorded in the master mask by flash irradiation, and within a very short period of time as described above.

Flash irradiation for an irradiation time of 1 microsecond or less prevents the diffusion of heat in the recording layer in the crosswise direction, and makes it possible to obtain an optical memory with information recorded therein in a very short period of time at a resolving power of 1 $\mu$m or less.

The master mask with information recorded therein can also be disposed over the above described optical memory material, and scanning then conducted with an argon ion laser beam, for example. The smaller the spot diameter of the scanning laser beam, the longer the time required for copying. Therefore, the spot diameter is at least 10 $\mu$m. From the standpoint of reducing the power of the laser to be used for copying, it is preferred to use a laser beam having a spot which is short in the direction in which the beam is scanned and long in the direction perpendicular to the beam scanning direction.

The beam reaches the heat mode material through a transparent area (e.g., a bit) recorded in the mask. This causes thermal deformation such as melting, evaporation or aggregation at the irradiated area, allowing the recording of information. Therefore, according to this embodiment of the invention it is possible to copy the record of the mask on an optical memory material in a short period of time since use is made of a laser beam which is focussed to a spot having a diameter of at least 10 $\mu$m. The diameter of the laser beam spot as used herein is very large compared with that of the laser beam focussed to about 1 $\mu$m, which is generally used in the art. Information is recorded in the master mask as bits of about 1 $\mu$m in size. Therefore, several to several tens of information bits on a master mask can be recorded at the same time on the heat mode material as thermal deformations. For example, it takes 30 minutes to record information by scanning with a laser beam focussed to a spot having diameter of about 1 $\mu$m while rotating an optical disc of a diameter of about 30 cm at 1,800 rpm. However, when the master mask with information recorded therein is used and a laser beam focussed to a diameter of 60 $\mu$m is scanned thereon at a rate of 60 m/sec according to the method of the invention, the same copy can be obtained in 50 seconds.

In order to prevent the diffusion of heat in the recording layer in the crosswise direction during the recording period when scanning with the laser beam and in order to increase the resolving power of the record, it is preferred to perform recording at such a scanning speed that the exposure time at each area of the optical memory material is 1 microsecond or less. By conducting thermal deformation by irradiation with a laser beam in such short periods of time, there can be obtained a resolving power of 1 $\mu$m or less.

The thus obtained information on the optical memory is optically taken out and is supplied for various applications.

The invention is described in further detail with reference to the following examples.

EXAMPLE 1

A Sn/SnS (3/1 by volume) mixture was vapor deposited on a 100 $\mu$m thick polyethylene terephthalate film so that the total thickness was 500 Å. Over the vapor deposited layer is closely disposed a master mask with image information recorded therein. The master mask was comprised of a glass substrate and a metallic chromium layer having a resolving power of 1 μm. The master mask was exposed to flash light from a xenon flash lamp. The flash light was focussed with a lens and cut with an optical chopper to adjust the exposure time to 1 microsecond. Thus, there was obtained a sharp copy having a resolving power of 1 μm.

As a comparative example, a vapor deposited film and a chromium mask prepared in the same manner as above were used and exposed to a xenon flash for 10 microseconds. The copy obtained had a maximum resolving power of only 10 μm.

EXAMPLE 2

A In/GeS (3/1 by volume) mixture was vapor deposited on 100 μm thick polyethylene terephthalate film so that the total thickness was 500 Å. Over the vapor deposited layer was closely disposed a master mask comprising a glass substrate and a chromium mask with digital information recorded therein. Then, a 3 W argon ion laser beam was focussed by means of an optical system so as to form a spot of a diameter of 60 μm on the chromium mask, and was scanned on the master at a rate of 60 m/sec (corresponding to an exposure time of 1 microsecond) to copy the master on the vapor deposited layer. There was obtained a sharp copy at a resolving power of 1 μm.

As a comparative example, a vapor deposited film and a chromium mask prepared in the same manner as above were used, and a 1 W argon ion laser beam focussed in the same manner as above was scanned on the master at a rate of 6 m/sec (corresponding to an exposure time of 10 microseconds). The copy obtained had a maximum resolving power of only 10 μm.

As is clearly seen from the results in the above examples and comparative examples, a long exposure time causes the diffusion of heat in the recording layer in the crosswise direction, resulting in low resolving power. On the other hand, according to this invention, the diffusion of heat is minimized so that extremely high resolving power can be achieved.

While the invention has been described in detail and with reference to specific embodiments thereof, it will be apparent to one skilled in the art that various changes and modifications can be made therein without departing from the spirit and scope thereof.

What is claimed is:

1. A method of copying optical information, comprising the steps of:
    disposing a master mask with a signal recorded therein directly adjacent an optical memory material comprising a heat mode recording material capable of performing thermal recording upon the application of an energy beam; and
    permitting recording onto said optical memory material through said master mask by irradiating said master mask with a flash of xenon light for a period of 1 microsecond or less;
    wherein said heat mode recording material comprises a support having thereon a mixed layer of a metal selected from the group consisting of Sn, Bi, or In, and a substance capable of increasing recording sensitivity selected from the group consisting of PBO, $WO_3$, $TiO_2$, SiO, $SiO_2$, $ZrO_2$, $SnO_2$, InO, $In_2O_3$, $In_2O$, chalcogenide substances containing Ge, In, Sn, Cu, Ag, Fe, Bi, Zn and V, halides including $PbX_2$, AgX, $SnX_2$, $SbX_5$ and $SbX_3$, wherein X represents a halogen, As, Sb, P, Ge, Si and Te.

2. A method of copying information, comprising the steps of:
    disposing a master mask with information recorded therein directly adjacent an optical memory material comprising a heat mode recording material capable of performing thermal recording upon the application of an energy beam; and
    permitting recording onto said optical memory material through said master mask by irradiating the master mask with a flash of xenon light for a period of 1 microsecond or less; and
    wherein said heat mode recording material comprises a support having thereon a mixed layer of a metal selected from the group consisting of Sn, Bi, or In, and a substance capable of increasing recording sensitivity selected from the group consisting of PBO, $WO_3$, $TiO_2$, SiO, $SiO_2$, $ZrO_2$, $SnO_2$, InO, $In_2O_3$, $In_2O$, chalcogenide substances containing Ge, In, Sn, Cu, Ag, Fe, Bi, Zn and V, halides including $PbX_2$, AgX, $SnX_2$, $SbX_5$ and $SbX_3$, wherein X represents a halogen, As, Sb, P, Ge, Si and Te.

3. A method of copying optical information, comprising the steps of:
    disposing a master mask with a signal recorded therein directly adjacent an optical memory material comprising a heat mode recording material capable of performing thermal recording upon the application of an energy beam; and
    permitting recording onto said optical memory material through said master mask by scanning the same with a laser beam focused to a spot having a diameter on the order of and at least 10 μm, with the exposure time at each area of the optical memory material being 1 microsecond or less; and
    wherein said heat mode recording material comprises a support having thereon a mixed layer of a metal selected from the group consisting of Sn, Bi, or In, and a substance capable of increasing recording sensitivity selected from the group consisting of PBO, $WO_3$, $TiO_2$, SiO, $SiO_2$, $ZrO_2$, $SnO_2$, InO, $In_2O_3$, $In_2O$, chalcogenide substances containing Ge, In, Sn, Cu, Ag, Fe, Bi, Zn and V, halides including $PbX_2$, AgX, $SnX_2$, $SbX_5$ and $SbX_3$, wherein X represents a halogen, As, Sb, P, Ge, Si and Te.

4. A method of copying optical information, comprising the steps of:
    disposing a master mask with information recorded thereon directly adjacent an optical memory material comprising a heat mode recording material which is capable of performing thermal recording upon the application of an energy beam; and
    permitting recording onto said optical memory material through said master mask by scanning the same with a laser beam focused to a spot having a diameter on the order of and at least 10 μm with the exposure time at each area of the optical memory material being 1 microsecond or less; and
    wherein said heat mode recording material comprises a support having thereon a mixed layer of a meteral selected from the group consisting of Sn, Bi, or In, and a substance capable of increasing recording sensitivity selected from the group consisting of PBO, $WO_3$, $TiO_2$, SiO, $SiO_2$, $ZrO_2$, $SnO_2$, InO, In$_2$O$_3$, In$_2$O, chalcogenide substances containing Ge, In, Sn, Cu, Ag, Fe, Bi, Zn and V, halides including PbX$_2$, AgX, SnX$_2$, SbX$_5$ and SbX$_3$, wherein X represents a halogen, As, Sb, P, Ge, Si and Te.

5. A method of copying optical information as claimed in any one of claims 1, 2, 3 and 4, wherein said substance capable of increasing recording sensitivity is selected from the group consisting of GeS, SnS, and PbI$_2$.

6. A method of copying optical information comprising the steps of:

disposing a master mask with a signal recorded therein directly adjacent an optical memory material comprising a heat mode recording material capable of performing thermal recording upon the application of an energy beam; and permitting recording onto said optical memory material by substantially uniformly exposing portions thereof exposed through said master mask by irradiating the master mask with a flash of xenon light for a period of 1 microsecond or less, wherein said heat mode recording material comprises a support having thereon a recording layer comprising a lamination comprised of a layer of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga In, Si, Ge, Te, Pb, Po, Sn, As, Sb, Bi, and Se, and a layer of a substance capable of increasing recording sensitivity selected from the group consisting of PbO, WO$_3$, TiO$_2$, SiO, ZrO$_2$, SiO$_2$, SnO, SnO$_2$, InO, In$_2$O$_3$, and In$_2$O; chalcogenide substances containing Ge, In, Sn, Cu, Ag, Fe, Bi, Zn, and V; halides such as PbX$_2$, AgX, SnX$_2$, SbX$_5$ and SbX$_3$ (wherein X represents a halogen, e.g., fluorine, chlorine, bromine, and iodine); and As, Sb, P, Ge, Si, and Te.

7. A method of copying information, comprising the steps of:

disposing a master mask with information recorded therein directly adjacent an optical memory material comprising a heat mode recording material capable of performing thermal recording upon the application of an energy beam; and permitting recording onto said optical memory material by substantially uniformly exposing portions thereof exposed through said master mask by irradiating the master mask with a flash of xenon light for a period of 1 microsecond or less, wherein said heat mode recording material comprises a support having thereon a recording layer comprising a lamination comprised of a layer of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, G, Te, Pb, Po, Sn, As, Sb, Bi, and Se, and a layer of a substance capable of increasing recording sensitivity selected from the group consisting of PbO, WO$_3$, TiO$_2$, SiO, SiO$_2$, ZrO$_2$, SnO, SnO$_2$, InO, In$_2$O$_3$, and In$_2$O; chalcogenide substances containing Ge, In, Sn, Cu, Ag, Fe, Bi, Zn, and V; halides such as PbX$_2$, AgX, SnX$_2$, SbX$_5$ and SbX$_3$ (wherein X represents a halogen, e.g., fluorine, chlorine, bromine, and iodine); and As, Sb, P, Ge, Si, and Te.

8. A method of copying optical information, comprising the steps of:

disposing a master mask with a signal recorded therein directly adjacent an optical memory material comprising a heat mode recording material capable of performing thermal recording upon the application of an energy beam; and permitting recording onto said optical memory material by substantially uniformly exposing portions thereof exposed through said master mask by scanning the same with a laser beam focused to a spot having a diameter on the order of and at least 10 micrometers, with the exposure time at each area of the optical memory material being 1 microsecond or less, wherein said heat mode recording material comprises a support having thereon a recording layer comprising a lamination comprised of a layer of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a layer of a substance capable of increasing recording sensitivity selected from the group consisting of PbO, WO$_3$, TiO$_2$, SiO, SiO$_2$, ZrO$_2$, SnO, SnO$_2$, InO, In$_2$O$_3$, and In$_2$O; chalcogenide substance containing Ge, In, Sn, Cu, Ag, Fe, Bi, Zn, and V; halides such as PbX$_2$, AgX, SnX$_2$, SbX$_5$ and SbX$_3$ (wherein X represents a halogen, e.g., fluorine, chlorine, bromine, and iodine); and As, Sb, P, Ge, Si, and Te.

9. A method of copying optical information, comprising the steps of:

disposing a master mask with information recorded thereon directly adjacent an optical memory material comprising a heat mode recording material which is capable of performing thermal recording upon the application of an energy beam; and permitting recording onto said optical memory material by substantially uniformly exposing portions thereof exposed through said master mask by scanning the same with a laser beam focused to a spot having a diameter on the order of and at least 10 micrometers, with the exposure time at each area of the optical memory material being 1 microsecond or less, wherein said heat mode recording material comprises a support having thereon a recording layer comprising a lamination comprised of a layer of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a layer of a substance capable of increasing recording sensitivity selected from the group consisting of PbO, WO$_3$, TiO$_2$, SiO, SiO$_2$, ZrO$_2$, SnO, SnO$_2$, InO, In$_2$O$_3$, and In$_2$O; chalcogenide substances containing Ge, In, Sn, Cu, Ag, Fe, Bi, Zn, and V; halides such as PbX$_2$, AgX, SnX$_2$, SbX$_5$ and SbX$_3$ (wherein X represents a halogen, e.g., fluorine, chlorine, bromine, and iodine); and As, Sb, P, Ge, Si, and Te.

10. A method of copying optical information comprising the steps of:

disposing a master mask with a signal recorded therein directly adjacent an optical memory material comprising a heat mode recording material capable of performing thermal recording upon the application of an energy beam; and permitting recording onto said optical memory material by substantially uniformly exposing portions thereof exposed through said master mask by irradiating the master mask with a flash of xenon light for a period of 1 microsecond or less, wherein said heat mode recording material comprises a support having thereon a recording layer comprising a mixed layer comprised of a metal selected from the group consisting of Mg, Sc, Y, Ti, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a substance capable of increasing recording sensitivity selected from the group consisting of PbO, $WO_3$, $TiO_2$, SiO, $SiO_2$, $ZrO_2$, SnO, $SnO_2$, InO, $In_2O_3$, and $In_2O$; chalcogenide substances containing Ge, In, Sn, Cu, Ag, Fe, Bi, Zn, and V; halides such as $PbX_2$, AgX, $SnX_2$, $SbX_5$ and $SbX_3$ (wherein X represents a halogen, e.g., fluorine, chlorine, bromine, and iodine); and As, Sb, P, Ge, Si, and Te.

11. A method of copying information, comprising the steps of:
   disposing a master mask with information recorded therein directly adjacent an optical memory material comprising a heat mode recording material capable of performing thermal recording upon the applicaion of an energy beam; and
   permitting recording onto said optical memory material by substantially uniformly exposing portions thereof exposed through said master mask by irradiating the master mask with a flash of xenon light for a period of 1 microsecond or less, wherein said heat mode recording material comprises a support having thereon a recording layer comprising a mixed layer comprised of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a substance capable of increasing recording sensitivity selected from the group consisting of PbO, $WO_3$, $TiO_2$, SiO, $SiO_2$, $ZrO_2$, SnO, $SnO_2$, InO, $In_2O_3$, and $In_2O$; chalcogenide substances containing Ge, In, Sn, Cu, Ag, Fe, Bi, Zn, and V; halides such as $PbX_2$, AgX, $SnX_2$, $SbX_5$ and $SbX_3$ (wherein X represents a halogen, e.g., fluorine, chlorine, bromine, and iodine); and As, Sb, P, Ge, Si, and Te.

12. A method of copying optical information, comprising the steps of:
   disposing a master mask with a signal recorded therein directly adjacent an optical memory material comprising a heat mode recording material capable of performing thermal recording upon the application of an energy beam; and
   permitting recording onto said optical memory material by substantially uniformly exposing portions thereof exposed through said master mask by scanning the same with a laser beam focused to a spot having a diameter on the order of and at least 10 micrometers, with the exposure time at each area of the optical memory material being 1 microsecond or less, wherein said heat mode recording material comprises a support having thereon a recording layer comprising a mixed layer comprised of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a substance capable of increasing recording sensitivity selected from the group consisting of PbO, $WO_3$, $TiO_2$, SiO, $SiO_2$, $ZrO_2$, SnO, $SnO_2$, InO, $In_2O_3$, and $In_2O$; chalcogenide substances containing Ge, In, Sn, Cu, Ag, Fe, Bi, Zn, and V; halides such as $PbX_2$, AgX, $SnX_2$, $SbX_5$ and $SbX_3$ (wherein X represents a halogen, e.g., fluorine, chlorine, bromine, and iodine); and As, Sb, P, Ge, Si, and Te.

13. A method of copying optical information, comprising the steps of:
   disposing a master mask with informtion recorded thereon directly adjacent an optical memory material comprising a heat mode recording material which is capable of performing thermal recording upon the application of an energy beam; and
   permitting recording onto said optical memory material by substantially uniformly exposing portions thereof exposed through said master mask by scanning the same with a laser beam focused to a spot having a diameter on the order of and at least 10 micrometers, with the exposure time at each area of the optical memory material being 1 microsecond or less, wherein said heat mode recording material comprises a support having thereon a recording layer comprising a mixed layer comprised of a metal selected from the group consisting of Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, and Se, and a substance capable of increasing recording sensitivity selected from the group consisting of PbO, $WO_3$, $TiO_2$, SiO, $SiO_2$, $ZrO_2$, SnO, $SnO_2$, InO, $In_2O_3$, and $In_2O$; chalcogenide substances containing Ge, In, Sn, Cu, Ag, Fe, Bi, Zn, and V; halides such as $PbX_2$, AgX, $SnX_2$, $SbX_5$ and $SbX_3$ (wherein X represents a halogen, e.g., fluorine, chlorine, bromine, and iodine); and As, Sb, P, Ge, Si, and Te.

* * * * *